Oct. 14, 1941.　　L. A. KILGORE ET AL　　2,259,311
ELECTRIC COUPLING
Filed March 11, 1939　　2 Sheets-Sheet 1
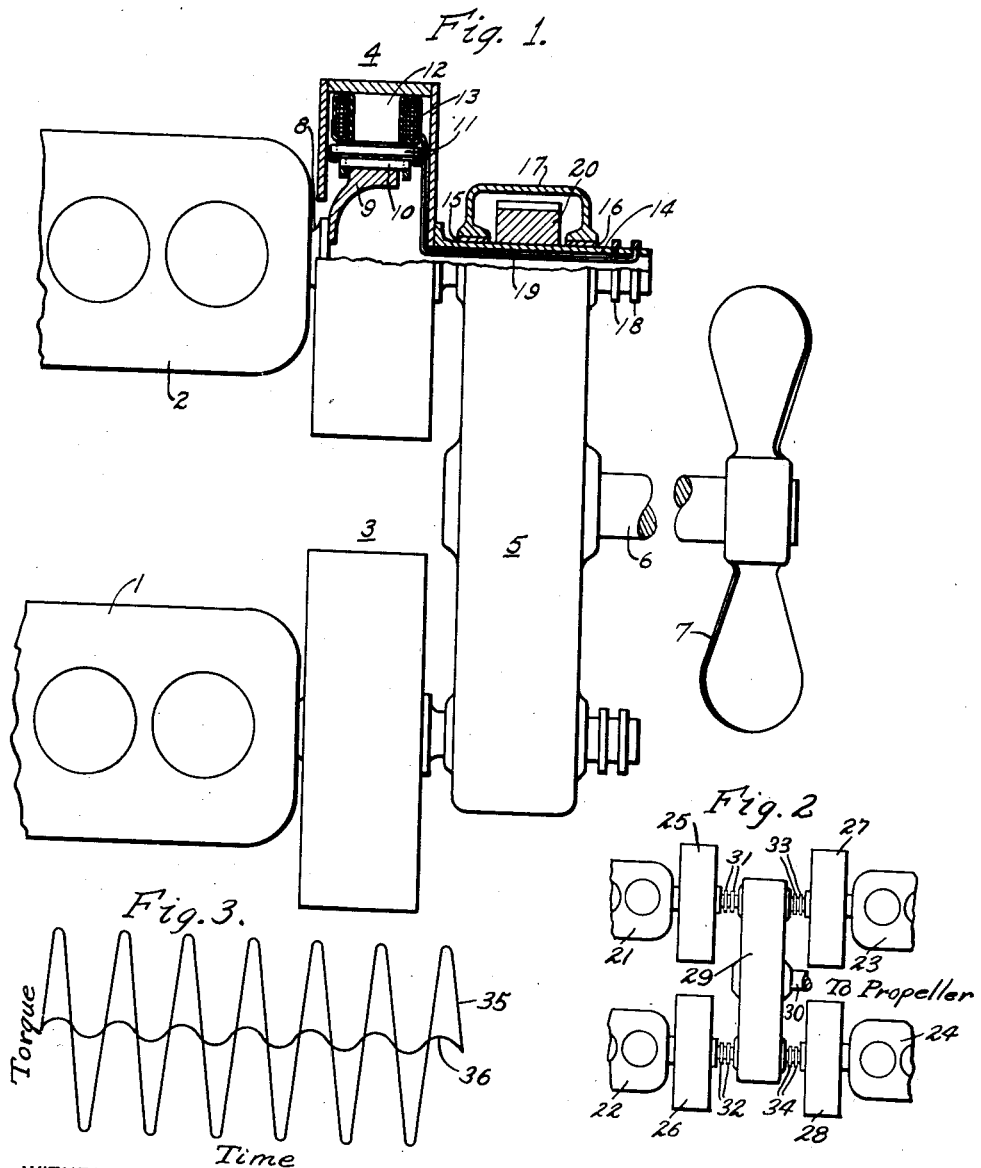

Oct. 14, 1941.  L. A. KILGORE ET AL  2,259,311
ELECTRIC COUPLING
Filed March 11, 1939   2 Sheets-Sheet 2
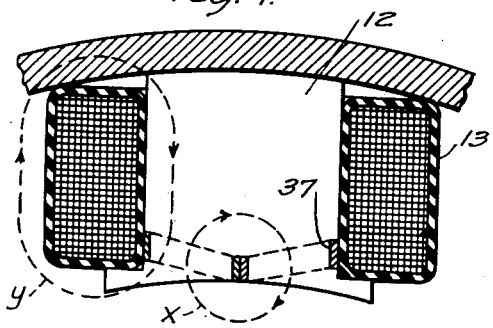
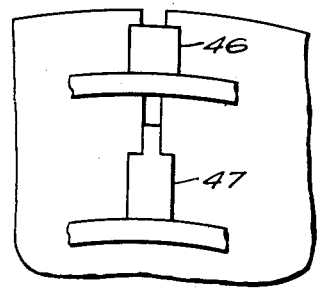
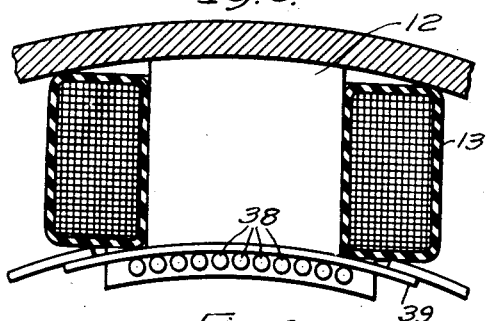
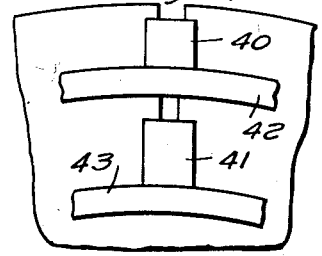
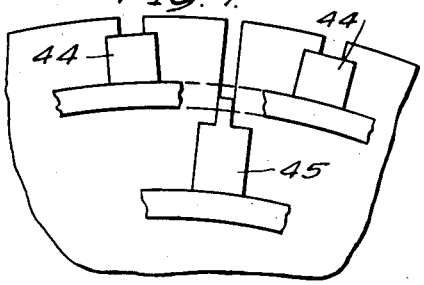
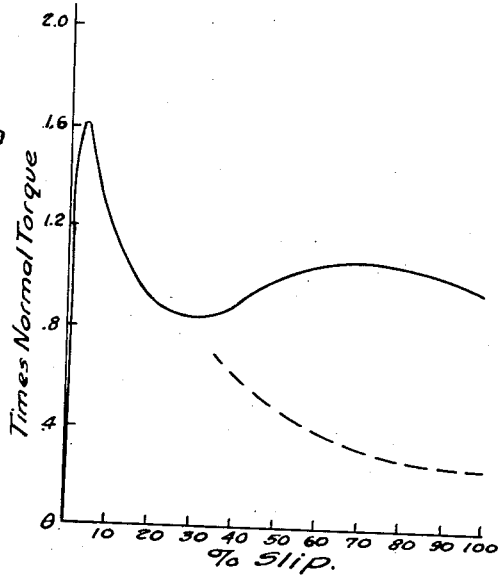
INVENTORS
Lee A. Kilgore and
René A. Baudry.
BY
Paul E. Friedemann
ATTORNEY Patented Oct. 14, 1941

2,259,311

UNITED STATES PATENT OFFICE 2,259,311

ELECTRIC COUPLING

Lee A. Kilgore, Forest Hills, and René A. Baudry, Pittsburgh, Pa., assignors to Westinghouse Electric & Manufacturing Company, East Pittsburgh, Pa., a corporation of Pennsylvania Application March 11, 1939, Serial No. 261,356

7 Claims. (Cl. 172—284)

Our invention relates in general to a mechanical drive employing an electric coupling. Our invention is particularly adapted to marine use wherein one or more Diesel engines is employed to drive a propeller or the like through an electromagnetic slip coupling. Our invention is not restricted to marine use or to Diesel engine drives but may be adapted to any mechanical drive.

In the past, various forms of couplings have been proposed for marine use. Mechanical clutches, for example, have been used but these have the disadvantage that all the torque pulsations from the engine are transmitted to the propeller. Electric drives have also been used employing motor generator sets which have outstanding disadvantages such as excessive weight and high losses in the electric equipment. Hydraulic couplings have also been used, but these have proved cumbersome and not very satisfactory. For example, it is important to be able to reverse a ship from full-speed ahead as quickly as possible to avert collisions. One method of operation with hydraulic couplings is to disconnect the engine from the gear then reverse the engine and reconnect the coupling. To accomplish this, about 50 to 95% torque is required to reverse the propeller with the ship going at nearly full speed ahead.

Applicants are aware that electric couplings of the electro-magnetic induction type have been used in the past in drive mechanisms. Applicants have invented a new type of electric coupling having characteristics which are different from and which are a substantial improvement over the conventional electric couplings.

An electric coupling having a short-circuited winding on one member and a direct current excitation on the other has a low slip at normal torque, and it has been supposed by many that such a device would transmit very little torsional vibration from one member to the other because the members appear to be free to slip. However, we have found by very careful theoretical analysis and from experience with squirrel-cage induction motors that this type of device at the usual torsional frequencies, which are above the normal slip frequency of the coupling, has a transient elastic coupling effect so that it may not only transmit a certain portion of the torque pulsations but may even amplify them due to resonance effects.

This "spring" action of an electric slip coupling can be explained by the fact that angular oscillations of one member with respect to the other result in induced currents (in the member with the short circuited winding), tending to hold the flux in its average position. The machine acts very much like a synchronous generator connected to a line, or very much like a synchronous type electric coupling having direct current excitation on both members.

A normally designed electric coupling is very likely to have a natural frequency in the range, at least of the lower (minor order) harmonics of the Diesel engine torque pulsations, or in the range of propeller torque pulsations which are chiefly those having a frequency equal to the number of propeller blades times the revolutions per second. It is thus very important to reduce the amplitude of torsional vibrations in order to get a satisfactory Diesel engine drive.

An object of our invention is to provide an electric coupling having high damping losses to reduce the transmission of torsional pulsations and secondly, to obtain appreciable torque at higher slips for the purposes hereinafter described.

Another object of our invention is to provide an improved Diesel engine driving mechanism, particularly adapted for marine use, employing a new and improved type of electric slip coupling having operating characteristics of high practical value such as, for example, that of minimizing transmission of torsional pulsations from the engine to the propeller or other load means.

Another object of our invention is to provide a Diesel engine drive for a propeller, particularly adapted to marine use, including an electric slip coupling and a reduction gear, and in which slip rings associated with a slip coupling are placed remotely from the slip coupling, and on the other side of the reduction gearing, the lead-in conductors of which coupling are led through a hollow shaft in the reduction gearing from the slip rings. The purpose of this arrangement is to eliminate lengthy overhanging shafts and minimize vibrations due to unbalance as will appear hereinafter.

Other objects and advantages will become more apparent from a study of the following specification when considered in conjunction with the accompanying drawings, in which:

Figure 1 is a diagrammatic plan view, partly in cross section, illustrating our invention as applied to a propeller which is driven by two Diesel engines;

Fig. 2 is a diagrammatic plan view of a Diesel engine drive embodying our invention in which four engines are used to drive a single propeller;

Fig. 3 shows curves illustrating pulsations occurring at the Diesel engine drive shaft as distinguished from the pulsations which occur in the driven member of the electric slip coupling designed in accordance with our invention;

Fig. 4 is a partial view in cross-section showing one of the salient poles on the driven member of the electric slip coupling illustrating a special form of damper winding;

Fig. 5 is a view similar to Fig. 4 except that a modified type of damper winding is employed;

Fig. 6 is a side view of a portion of the driving member of the slip coupling illustrating a particular form of double-deck damper winding in accordance with our invention;

Fig. 7 is a view similar to Fig. 6 showing a modified form of double-deck damper winding in accordance with our invention;

Fig. 8 is a view similar to Fig. 6 showing still another modified form of double-deck damper winding in accordance with our invention; and Fig. 9 shows a curve illustrating the speed torque characteristics of an electric coupling embodying our invention.

Referring in particular to Fig. 1, numerals 1 and 2 represent Diesel engines or other internal combustion type engines. Engines 1 and 2 drive electric slip couplings 3 and 4, respectively, which couplings drive a reduction gearing 5, which in turn drives a shaft 6 and propeller 7.

Referring more particularly to the drive from engine 2, it will be noted that the drive shaft 8 thereof has integrally connected thereto the inner or squirrel-cage element 9 of the electric slip coupling, that is, the element carrying the short-circuited, squirrel-cage type damper windings 10, 11. The driven member 12 of the electric slip coupling has a plurality of salient poles therein, each having a direct current excited field winding 13. The reduction gearing 5 includes a hollow sleeve type of shaft 14 which is supported by bearings 15 and 16 fixed on each side of casing 17 which encloses the reduction gearing. Slip rings 18 are provided on a projection of hollow shaft 14 which is remotely situated with respect to the slip coupling. In usual practice, slip ring such as 18 would be placed between the electric slip coupling and the reduction gearing, tending to lengthen the overhanging shaft, that is, tending to separate the coupling from the gearing to such an extent as to promote detrimental vibration due to unbalanced magnetic pull, or other unbalances in the high speed drive shaft. Direct current excitation is applied to slip rings 18 through brushes (not shown) and the current is conducted through lead wires 19 through the hollow sleeve type of shaft 14 to the field windings 13. A pinion 20 is formed integrally with member 14 and forms part of the reduction gearing (not shown) but which is represented by numeral 5 and which may be of any conventional type. It is understood, of course, that the construction of slip coupling 3 is identical to slip coupling 4 and the drive to the reduction gearing is also the same. In accordance with our invention, therefore, the free over-hanging shaft ends terminating at the slip coupling are made as short as possible, hence the comparatively high speed developed by the Diesel engine will have no detrimental unbalancing effect thereon.

It is understood, of course, that our electromagnetic clutch can also be used in conventional drives, that is, wherein the slip rings are on the member of the coupling which carries the field winding but being located between such member and the reduction gearing, thus eliminating the necessity of a hollow shaft in the reduction gearing. Such conventional construction, of course, may be desirable because of its lower cost of manufacture.

Fig. 2 is a modification of our invention which is similar to Fig. 1 except that four engines 21, 22, 23, 24 are used which drive slip couplings 25, 26, 27, 28, respectively. The slip couplings in turn drive a common reduction gearing 29 which transmits power to a propeller shaft 30 which is connected to a propeller (not shown). Slip rings 31, 32, 33, 34 are provided for electric slip couplings 25, 26, 27, 28, respectively.

Fig. 3 shows curves illustrating the torque versus time characteristics of the driving and driven member of the slip coupling embodying our invention. Curve 35 shows the relatively high torque pulsating characteristic of the drive shaft of a Diesel engine or of the driving member of the electric slip coupling, whereas curve 36 shows the relatively small torque pulsations but at the same frequency which are induced in the driven element of the slip coupling embodying our invention. The curves readily show that a minimum amount of torque pulsations of the Diesel engine is transmitted through the electric slip coupling which embodies our invention. Vibrations of the order of 28 cycles per second are typical in the engine drive shaft. In accordance with our invention the amplitude of curve 36 may be in the order of 10 or 15%, or even less, of that of curve 35. The impulses of the propeller and the minor order of harmonics of the Diesel engine are lower frequencies of the order of 2 to 6 cycles per second. At some speed one of these may be the same as the natural frequency of the coupling and the amplitude is limited by the damping.

Electric slip coupling, in accordance with our invention, may be broadly described as consisting of a driving and a driven member, one of which carries magnetic poles energized by direct current source and the other of which has a special type of short-circuited winding, the two members being separated by an air-gap. When a slight slip occurs between the coupling members, currents are induced in the short-circuited winding which react with the magnetic field produced by the poles so as to develop a torque which enables the coupling to transmit power and at the same time allowing slippage. It is understood, of course, that either the member carrying the magnetic poles or the member carrying the short-circuited winding or windings may be the driving member, that is, the member directly connected to the engine while the other is the driven member. The short-circuited winding in accordance with our invention may take the form of a squirrel-cage such as used in induction motors. We propose to get appreciable damping from the resistance losses of the main damper winding, making use of the increase in resistance at higher frequencies due to "skin effect" in deep bars. The preferable form of our slip coupling, however, is resolved in the use of double deck damper windings similar to those used in some induction motors, but their use in our slip coupling, however, is for an additional purpose and in some cases, for an entirely different purpose. By the use of double deck damper windings the improvement in the slip coupling is two-fold; first, higher damping losses are obtained, thus reducing transmission of torsional pulsations, and, second, appreciable torque at higher slip values is obtained. It may happen that the natural frequencies encountered are too high to be effectively damped by the losses of the main winding and too low to be most effectively reduced by a double deck damper winding which has the correct resistance to be effective in giving high torque at high slip or high loss at the higher frequency pulsations. Therefore, we propose to use a damper winding on the rotating member having the D. C. excitation. In its usual form, this winding consists of a pole face damper on salient poles with direct current excited field coils. It is desirable that this damper have at least one bar near the pole center to effectively link the quadrature axis flux, which is the component having the larger pulsation resulting from torsional oscillations. Fig. 4 shows such pole face damper winding.

Referring more particularly to Fig. 4, numeral 37 denotes the damper winding which is arranged adjacent the pole face of the salient pole. The winding in plan view would appear essentially as two rectangular bars arranged side by side and which are in contact with each other or are brazed together. The dotted line indicated by the letter X denotes the path of pulsating flux due to torsional oscillations, whereas the dotted line indicated by the letter Y denotes the path of pulsating flux due to unequal air-gap. The purpose of the damper winding is two-fold; first, to afford additional damping to torsional oscillations and secondly, to reduced unbalanced magnetic pull whenever the field carrying member is rotating. This latter action or corrective balancing effect comes from induced currents in the damper winding which tend to prevent a change of flux resulting from unequal air-gaps on two sides of the machine or slip coupling. Damper winding 37 is normally of low resistance in order to be effective in producing maximum loss at the natural frequency of the electromechanical system.

Fig. 5 shows a modified form of damper winding 38 comprising a plurality of bars side by side which are short-circuited by a pair of end rings or segments 39, one on each side of the pole. In other words, the damper windings of adjacent poles may or may not be interconnected by the elements 39.

As previously mentioned, we propose a double-deck damper winding for the electric slip coupling similar to that used on squirrel-cage motors but for the double purpose of obtaining high losses to limit transmission of torsional oscillations and to give high torque at low slip. The torque at slips from 100% to 30% is fairly constant, ranging from 98% to 108% of the normal torque developed at full-speed full-load of the engine. Torque is transmitted through our electric slip coupling by the reaction of the flux and the currents induced in the damper winding by the relative motion or the slip between the driving and driven members. The conductor bars of the squirrel-cage windings are disposed parallel to the axis of the rotating element carrying the bars to obtain maximum efficiency and to facilitate the manufacture of the couplings. Where a low resistance damper winding is provided, the slip necessary to transmit full load torque can be made very low, even less than 1% if necessary, to keep losses down. As the slip increases, the torque increases to a maximum value known as the pull-out torque. In our magnetic slip couplings, we use a double-deck winding having one separate, squirrel-cage winding of high resistance next to the air gap. This winding produces high torques at high slips, which is very desirable when starting and reversing a ship. The other separate squirrel-cage winding is farther from the air gap and is of low resistance. This second winding thus produces high low-slip torque with minimum losses. Together these two windings produce a very desirable slip-torque characteristic. This will be obvious from an inspection of the torque versus slip curve, illustrated in Fig. 9. It will be noted that by the use of the double-deck winding embodying our invention, the torque at high values of slip, say between 30% and 100%, is relatively high as compared with previous induction type couplings without the double-deck windings.

The action of the induction coupling to pulsating torques is not very simple. Where the frequency of the alternating components of torque are higher than the slip frequency at pullout (as is commonly the case), the flux linking the damping winding does not follow the motion of the other rotor exactly. The alternating components of the relative motion induce currents in the damper winding opposing any change in flux. This flux which is momentarily held fixed relative to the damper causes the torque resulting from alternating motion to be proportional to displacement. The presence of a high resistance winding next to the gap or a deep bar with a thin edge on top will give considerable losses due to the alternating torques and so provides damping. In this way it is seen that as far as pulsating torques are concerned it acts as if it were a flexible spring connection with mechanical damping.

As previously mentioned, we propose a double-deck damper winding for the double purpose of obtaining high losses to limit torsional oscillations and give high torque values at high slip. This high torque is desirable to aid in maneuvering so that if the coupling is energized with the engine running at a practical operating speed, the coupling will pull the propeller or whatever is being driven up to a low value of slip.

Another reason for requiring high torque at high slip in some cases is to provide for cranking the engine through the coupling. Values up to 90% torque may be required.

Another reason for desiring high torque at high slip would be in an engine limited from about ⅓ to full speed, or a constant speed motor driving a load requiring high torque for starting (35 to 125% being typical values for industrial loads).

The simple form of slip couplings previously disclosed having a single damper winding are not well suited to obtain this high starting or maneuvering torque without being made oversize. We proposed originally to use either a double-deck damper or a deep bar to give a high increase of resistance at high slip.

Various arrangements of the double-deck winding in accordance with our invention may be secured. The high resistance winding may be either in the same slots or in different slots than the low resistance winding.

Referring to Fig. 6 which shows one arrangement of the double deck winding, the high resistance damper bar 40 is located in the same slot as the substantially deep or elongated low resistance damper bar 41. It is understood, of course, that a number of such damper bars are disposed along the periphery of the driving member and each series of bars is short-circuited at both ends thereof by short circuiting rings 42 and 43. In other words, two separate and independent squirrel-cage windings are formed, one having the high resistance damper bars 40 and short-circuiting rings 42, while the other having the low resistance damper bars 41 together with the short-circuiting rings 43.

Fig. 7 shows a modified arrangement of the double-deck damper windings in which the high resistance damper bars 44 are arranged in separate slots from those of the low resistance damper bars 45. Furthermore, the low resistance damper bar is in the form of an inverted T in which the vertical portion of the T is relatively small. As high frequency currents are induced in the low resistance winding, by virtue of the so-called "skin effect," the current will tend to crowd in the upper or vertical portion of the T shape. Hence, this portion will afford a high resistance to such induced current, hence will produce substantial amount of power loss or torque even at high values of slip. A slip clutch or coupling in accordance with our invention transmits power proportional to the power loss in the damper winding divided by the slip just as in an induction motor. The characteristics are more nearly analogous to those of an induction motor since in this case, the total current in the exciting winding is constant.

Fig. 8 shows another modification of a double-deck winding in which a high resistance damper bar 46 is in the same slot as the low resistance damper bar 47 but wherein the low resistance damper bar is in the form of an inverted T similar to that described in Fig. 7 instead of being rectangular in form as the low resistance damper bar described in Fig. 6.

While the electric slip coupling is shown in Diesel engine drive for marine use, it is obvious that it is not restricted to such use and may be of general application wherever a slip coupling is desirable or wherever it is desirable to quickly or automatically disengage a coupling by electric circuit means.

We, of course, are aware that others, particularly after having had the benefit of the teachings of our invention, may devise other devices embodying our invention, and we, therefore, do not wish to be limited to the specific showings made in the drawings and the descriptive disclosure hereinbefore made, but wish to be limited only by the scope of the appended claims and such prior art that may be pertinent.

We claim as our invention:

1. An electromagnetic slip coupling comprising, in combination, a driving member and a driven member, one of said members including a short-circuited winding of relatively high resistance, and a separate short-circuited winding of relatively low resistance, the other of said members including a field winding and a short-circuited, low resistance, damper winding which is surrounded by said field winding.

2. An electromagnetic slip coupling comprising, in combination, a driving member and a driven member, one of the members including a short-circuited winding of relatively high resistance and a separate short-circuited winding of relatively low resistance, the other of said members including a plurality of salient poles having field windings thereon adapted to be energized with direct current, and a low resistance, short-circuited damper winding on the pole face of each of said poles to limit transmission of torsional oscillations and to limit unbalanced magnetic pull.

3. An electromagnetic slip coupling comprising, in combination, a driving member and a driven member, one of said members including a plurality of salient poles having pole tips, each of which poles includes a field winding and a damper winding which encircles the field pole, and has a portion which is supported by the pole tip, said damper winding being surrounded by the field winding, the other of said members including a short-circuited, low resistance, damper winding to limit transmission of torsional oscillations and to limit unbalanced magnetic pull.

4. An electromagnetic slip coupling comprising, in combination, a driving member and a driven member, one of said members comprising a rotor having two concentric rows of conductor receiving openings near the surface thereof, a plurality of conductor bars in one of said rows and extending parallel to the axis of said rotor, end ring means connected to said conductor bars and forming a squirrel-cage winding, a second plurality of conductor bars in the other of said rows, end ring means connected to said latter conductor bars forming a second separate squirrel-cage winding, one of said squirrel-cage windings having a substantially greater resistance than the other, the driven member comprising a plurality of salient poles having direct current energized windings thereon, each pole having a plurality of pole tips and having two rectangular shaped, low resistance damper windings disposed side by side and joined together at the central portion of the pole face, and having portions supported by the pole tips and surrounded by the field winding.

5. An electromagnetic slip coupling comprising, in combination, a driving member and a driven member, the driving member comprising a rotor having two concentric rows of conductor receiving openings near the surface thereof, a plurality of conductor bars in one of said rows and extending parallel to the axis of said rotor, end ring means connected to said conductor bars and forming a squirrel-cage winding, a second plurality of conductor bars in the other of said rows, end ring means connected to said latter conductor bars forming a second squirrel-cage winding, said first squirrel-cage winding being of substantially higher resistance and being closer to the surface of said rotor than said second squirrel-cage winding, the cross-section of the conductor bars of said second squirrel-cage winding being substantially of an inverted T-shape wherein the horizontal portion of the T is of substantially greater cross-sectional area than the vertical portion of the T, the conductor bars of said second squirrel-cage winding being staggered relative to those of said first squirrel-cage winding, the driven member being concentrically disposed with respect to, and surrounding the driving member and having a plurality of direct current energized salient pole field windings.

6. An electromagnetic slip coupling comprising, in combination, a driving member and a driven member, one of said members including a plurality of direct current energized salient poles and the other of said members including double decked, short circuited windings, one of relatively high resistance and the other of relatively low resistance, the respective resistances being of such value as to provide maximum pull out torque at a low slip value and to provide a torque of at least 70% normal torque throughout a range from 2 to 28 cycles per second thereby minimizing the transmission of torsional oscillations from the driving member to the driven member.

7. An electromagnetic slip coupling comprising, in combination, a driving member powered by an internal combustion engine and a driven member, one of said members including a plurality of direct current energized salient poles and the other of said members including double decked, short circuited windings, one of relatively high resistance and the other of relatively low resistance, the respective resistances being of such value as to provide a torque of at least 70% normal torque throughout a range from 2 to 28 cycles per second thereby minimizing the transmission of torsional oscillations from the driving member to the driven member and to provide a maximum pull out torque at low slip value which is over twice this value.

LEE A. KILGORE.
RENÉ A. BAUDRY.